UNITED STATES PATENT OFFICE.

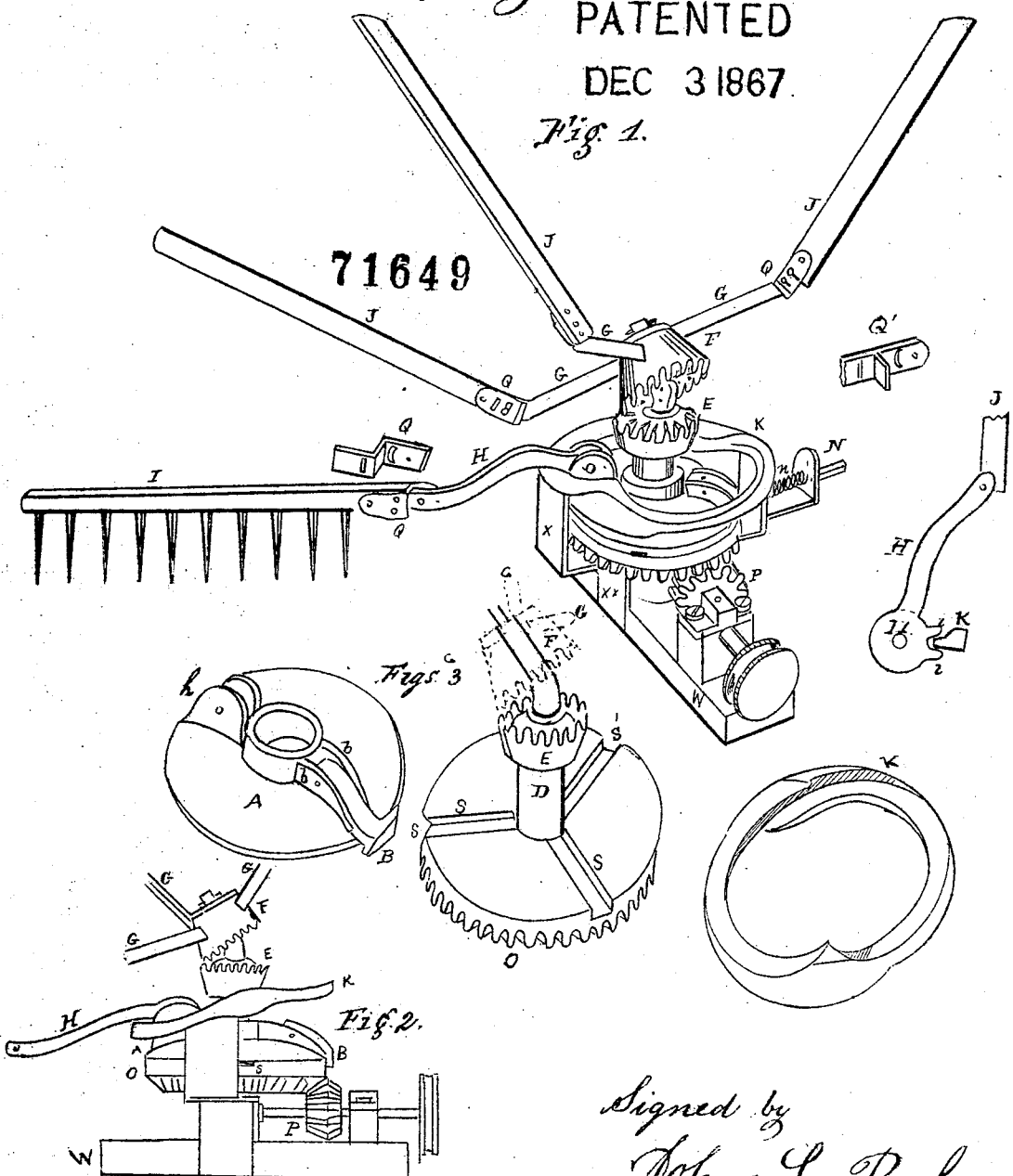

JOHN L. ROHRER, OF UPPER LEACOCK TOWNSHIP, PENNSYLVANIA.

IMPROVEMENT IN HARVESTER-RAKES.

Specification forming part of Letters Patent No. 71,649, dated December 3, 1867.

*To all whom it may concern:*

Be it known that I, JOHN L. ROHRER, of Upper Leacock township, in the county of Lancaster and State of Pennsylvania, have invented a new and Improved Mode of Combining a Reel and Raking Attachment on Reaping-Machines; and I do hereby declare that the following is a full, clear, and exact description of the construction and operation of the same, reference being had to the accompanying drawings, making a part of this specification, in which—

Figure 1 is a perspective view of the combination; Fig. 2, a longitudinal elevation; Figs. 3, detached portions to illustrate some of the details, as are other separate figures, designated by their respective letters.

The novelty consists in operating the reel and rake attachment by the same gearing on the same vertical shaft, inclined at the top, and so as to arrest the rake at pleasure (where the grain is thin) without arresting or interfering with the motion of the reel or gathering arms; also, in the mode of connecting the reel-arms with the arms of the spider and beveled wheel, as also the rake-handle, by means of a two-slotted plate, so as to allow said arms and handle to be adjusted in two directions.

To enable others skilled in the art to make and use my invention, I will proceed to describe its construction and operation.

On a suitable foundation or bed plate, W, I have the box and bearing for a bevel-pinion, P, on a horizontal shaft, driven by chain connections, or otherwise, by the wheel of the reaper. This pinion P meshes into and imparts motion to a beveled cog-wheel, O, of a larger size. Said cog-wheel O is provided with a collar or sleeve, forming a hollow shaft, D, on which hollow shaft or tube D there is a beveled pinion, E. These jointly revolve on a central fixed shaft, which shaft is bent inward at an angle of, say, forty-five degrees above said pinion E, for the reception of a similar bevel-pinion, F, meshing with the pinion E in an inclined position. The pinion F is also provided with spider-like arms G, for the reception or connection with the beaters or arms J. A washer and pin secure it to the shaft. The horizontal larger wheel O, which operates the pinions E F, has three or more slots, S, cut into its upper face, to perform the office of clutch attachment. A cap, A, covers this top, somewhat convex on its upper side, with a collar surrounding the cylindrical shaft D, and is provided with one or more open slot or slots, with side flanges, b, which hold a clutch on a pivot that drops into the slot S of the cogged wheel O, and thus causes the cap A to revolve in unison with the same. The cap A, between a pair of brackets or flanges, h, also holds the arm H connected with the rake I on a pivot, which is, of course, carried in its motion with the cap aforesaid. On one side there is an inclined plane or stop, n, on the end of a spring-shaft, N, operated by a hand or foot lever to push it against the outer circumference of the wheel O, which, in its revolution, brings the clutch against the lower bevel of the clutch B, so as to raise it on its pivot, in the flanges of the cap, out of the groove or slot S in the top of the wheel O, and thus arresting the motion of the cap A, with its rake attachment, while the reel continues its motion, as before. By simply relaxing the lever, the spring draws the arrester or stop n back, and the clutch B, on its free pivot in b, drops down and locks the cap again to the wheel, and then the action of the rake is resumed.

To operate the rise and fall of my rake in its revolution with the reel I employ an annular camway, K, which consists in part of a double inclined plane on sides opposite each other, each occupying, say, sixty degrees of the circle, leaving one hundred and twenty degrees in a plane on opposite sides, one elevated above the other; the lower plane carrying the rake parallel to the platform, across the same, in the ordinary manner. The rake-arm H has a circular head, I I, provided with two cogs or teeth, i, the operation being so as to carry the rake-arm H over the lower plane, and that the rake I sweeps from the cutter-bar to the rear of the platform, at which point the camway rises upward, with an inner inclined track for the upper tooth, i, which is carried up, thereby bringing the rake to a vertical position. Thus elevated, it traverses the upper plane past the driver, when the tooth or cog i is again carried down by the opposite inner inclined plane to the previous horizontal raking position by each revolution of the cogged gearing.

In order to allow of the adjustment of the rake and reel arms, I introduce a connecting-plate, Q or Q', which has an oblong open slot, and also a curved slot, and is fastened on by a bar and screw-bolt, which allows the attached arm to be raised at the heel, up or down, as also to be inclined more or less on the end or pivot-bolt, thus adapting the adjustment to the platform of the reaper. By this arrangement I bring the reel in a convenient position on the same shaft that revolves the rake, without the one interfering with the motion of the other, or being in the way of the driver, gathering in the grain in a superior manner, while the driver has the action of the rake at command to arrest its motion, where the grain is thin, so as to collect a full-sized sheaf, when its action is had by simply releasing the lever, (not shown, but) connected with the spring-rod N and stop $n$, altogether forming a useful, and, as fully believed, a novel combination.

What I claim as my invention, and desire to secure by Letters Patent, is—

1. The combination and arrangement of the reel-arms J with the spider G G G and pinion F, in combination with the pinion E, operating obliquely, both on the same shaft, and operated with the raking attachment, in the manner and for the purpose specified.

2. I also claim the arrangement of the clutch B in its flange, pivot $b$ on the cap A, operated by a spring-rod, N, to connect and disconnect the cap with the driving-wheel O, which actuates the rake and reel, in the manner and for the purpose set forth.

3. I claim the bent or shouldered plates Q, provided with a straight and a curved slot, when employed for connecting and adjusting the rake-arm I or reel-arms J with the arms G and H, in the manner and for the purpose specified.

JOHN L. ROHRER.

Witnesses:
CHAS. R. FRAILEY,
JACOB STAUFFER.